US011995467B1

(12) United States Patent
Goacher et al.

(10) Patent No.: US 11,995,467 B1
(45) Date of Patent: May 28, 2024

(54) VALIDATION, DELETION, AND RECOVERY OF RESOURCES IN A SERVICE ENVIRONMENT

(71) Applicant: Amazon Technologies, Inc., Seattle, WA (US)

(72) Inventors: Suresh Prakash Goacher, Hyderabad (IN); Arun Anilkumar, Thiruvananthapuram (IN); Nishit Nihal Vas, Mysore (IN)

(73) Assignee: Amazon Technologies, Inc., Seattle, WA (US)

( * ) Notice: Subject to any disclaimer, the term of this patent is extended or adjusted under 35 U.S.C. 154(b) by 393 days.

(21) Appl. No.: 17/376,017

(22) Filed: Jul. 14, 2021

(51) Int. Cl.
  *G06F 16/215*  (2019.01)
  *G06F 9/50*  (2006.01)
  *G06F 9/54*  (2006.01)

(52) U.S. Cl.
  CPC ............ *G06F 9/5005* (2013.01); *G06F 9/547* (2013.01)

(58) Field of Classification Search
  CPC ................................ G06F 9/5005; G06F 9/547
  See application file for complete search history.

(56) References Cited

U.S. PATENT DOCUMENTS 9,002,805 B1 * 4/2015 Barber .................. G06F 16/215
  707/692
10,049,023 B1 * 8/2018 Bhalerao ............. G06F 11/2035

OTHER PUBLICATIONS

Dong Zheng et al. "Toward Assured Data Deletion in Cloud Storage", IEEE Network • May/Jun. 2020 (Year: 2020).*
Vanitha et al. "Secured Data Destruction in Cloud Based MultiTenant Database Architecture" (Year: 2014) (Year: 2014).*

* cited by examiner

*Primary Examiner* — Kevin L Young
*Assistant Examiner* — Abdou K Seye
(74) *Attorney, Agent, or Firm* — Eversheds Sutherland (US) LLP

(57) ABSTRACT

Systems, devices, and methods are provided for validation, deletion, and/or recovery of resources in a service environment. A machine (e.g., server) may receive a request to identify or discover a list of resources that are unused in a service environment. A machine (e.g., server) may receive a request to delete one or more resources in a service environment. In at least one embodiment, deletion of a resource involves a two-stage process where the resource is recoverably deleted in a first stage (e.g., by deactivating or disabling the resource) such that the resource can be recovered prior to a predetermined time period by reactivating or re-enabling the resource and, in a second stage, the resource is unrecoverably deleted.

20 Claims, 8 Drawing Sheets

VALIDATION, DELETION, AND RECOVERY OF RESOURCES IN A SERVICE ENVIRONMENT

BACKGROUND

Customers of a computing resource service provider may utilize many different types of resources. For example, one type of resource that customers can utilize in a computing resource service provider is a code deployment service that automates the deployment of software across various resources available to the computing resource service provider. Furthermore, various services such as hardware migration, service migration, service deprecation, etc. may involve the use of multiple resources. Manually using multiple tools to identify and delete unused resources after such events may be cumbersome to customers. Automated mechanisms for detecting and tracking unused resources can be utilized by customers and reduce the amount of time and effort that engineers spend to maintain a clean work environment.

Figure 1:
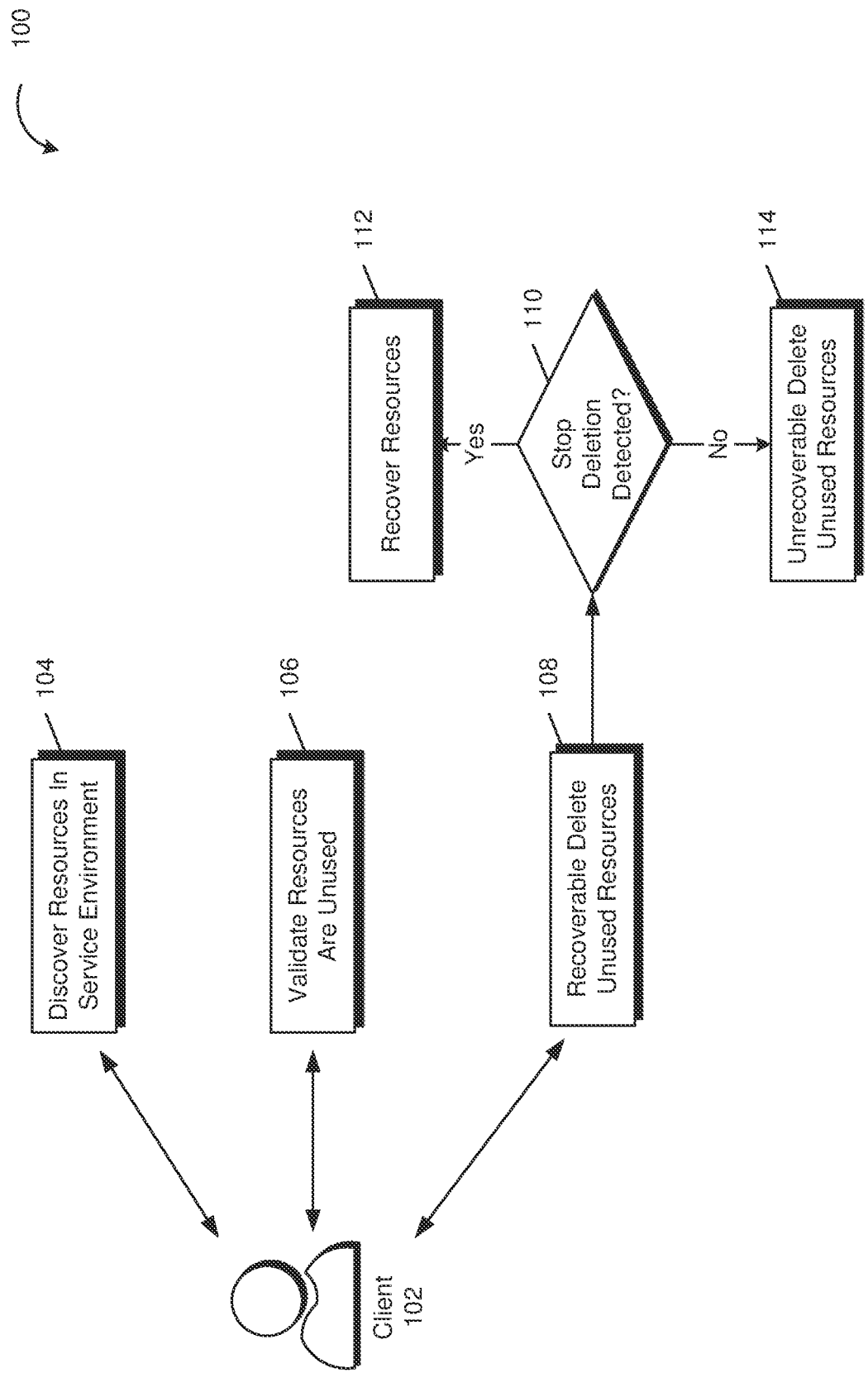
FIG. 1 illustrates a computing environment in which unused resources of a service environment are cleaned up, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Example embodiments described herein provide certain systems, methods, and devices for managing customer resources within a computing resource service provider. In various embodiments, techniques described herein may be utilized to perform a list or discover workflow to identify resources associated with a particular customer computing environment (e.g., all resources associated with a service root identifier), perform a validation workflow to determine whether it is safe to delete the identified resources by performing resource type-specific validation checks, and then perform a deletion workflow for resources. The deletion workflow may involve a soft deletion and hard deletion workflow where resources are first deactivated or disabled during a first stage of deletion such that the resources are still recoverable. After a predetermined period of time, the deactivated/disabled resources may then be deleted in an unrecoverable manner.

In various embodiments, customers interact with a computing resource service provider via a network by submitting application programming interface (API) commands via a graphical interface (e.g., web-based console) that provides a mechanism for identifying resources mapped to a service environment, validate whether those resources may be deleted, and perform management functions such as deleting resources that are no longer used or should no longer be used. The graphical interface may be used to submit web service API requests to the computing resource service provider, which may implement various workflows for the respective functionality described above.

A list workflow—which may also be referred to as a discovery workflow—may refer to the execution of a series of tasks that find resources associated with a service environment and inventory the resources and descriptions of the resources in a database, which may subsequently be used for validation and deletion workflow. In various embodiments, a customer initiates a list workflow by specifying an identifier for a root entity such as a service root identifier in a list or discovery request. The request may be received via an API gateway and processed using a serverless compute service. A serverless compute function may be executed which enumerates through all resources associated with the root entity and a set of properties are determined for each enumerated resource. The resource properties may include a resource name, resource type, resource namespace, and resource identifier. The resource properties may be recorded in a database and queried later for validation or deletion. Enumerated resources may include additional resources themselves (e.g., sub-resources) and resource properties for those additional resources may also be collected. This process may be performed in an iterative fashion to discover all resources, sub-resources, sub-resources of sub-resources, etc. associated with a root entity. A notification (e.g., email) may be sent to a customer upon completion of the workflow, indicating an outcome of the workflow, such as a success code or a failure code indicating how the workflow failed to complete.

In various embodiments, a list or discovery workflow is successfully executed and a plurality of records are stored in a database. The database may be queried to provide customers with a view into which resources exist within a particular service environment. For example, a graphical interface may provide a customer with a dashboard graphical user interface (GUI) where the customer is able to review, sort, and filter on the records in the database.

A validation workflow may be performed on some or all resources identified within a service environment. For example, a customer may submit a command or request to perform an audit on all resources within a service environment to identify whether any resources can be deleted. These may be resources associated with deprecated or no longer supported versions of the service, resources that are no longer reachable and therefore cannot be utilized, and so on. In various embodiments, a customer submits a web service API request to the computing resource service provider that is routed to an API gateway. The API gateway routes the request or command to an appropriate endpoint, and a serverless compute function may be invoked. For example, a validated resources serverless compute function may be invoked. A set of resources may be specified in the request. For example, the request may indicate that all resources found within a service environment should be reviewed to determine whether they are safe to be deleted. The validate resources serverless compute function may queue up work (e.g., a step functions workflow) to be performed. The validation step functions workflow may comprise a set of tasks, some of which may be performed in parallel. In some embodiments, the validation step functions workflow comprises a first task (e.g., implemented as a serverless compute function) to get resources. Resources may be stored in a database as a result of a list or discovery workflow, and these resources may be retrieved for validation. In various embodiments, resources are segregated by resource type. Each resource type may be mapped to a resource-type specific validate resources task. For example, a first validate resources task may be executed for all of the service deployment environments and a second validate resources task different from the first may be executed for a second resource type such as VIPs. Each resource type-specific validate resource task may include business logic that is specific to a particular resource type (or multiple resource types) that can be used to evaluate whether a particular resource can be safely deleted. For example, for a service deployment environment, the resource type-specific validate resources task may include checks to determine whether there is active capacity, whether there are pending requests, whether there are pending requests, and whether the resource is a consumable resource for other services. These checks may be performed for each stage of a given service deployment environment. If each check is passed (e.g., answered in the negative) then the resource may be safe to delete, and this result may be saved in a database entry which can be reported back to the customer.

In various embodiments, the process of performing validation checks for different resource types and/or different resources is parallelized. For example, serverless compute functions for each resource type-specific validation task may be executed in parallel. Individual resources may be validated in parallel. Various techniques such as dynamic programming, Map-Reduce, or other parallel programming techniques may be used to more efficiently perform resource validation tasks. An update results serverless compute function may be used to update the results of running the validation tasks. This may involve saving the results to a database, for example, next to the database records for the discovered resources. In some cases, additional information may be logged to provide more information or context as to why a specific resource cannot be safely deleted. For example, if a resource is still in use, such information may be surfaced to the user, including, in some cases, how the resource is being used. A complete validation serverless compute function may be executed as a final step of a step functions workflow to perform any post-processing activities, such as notifying the customer of the completion of the validation task, whether the step functions workflow executed to completion, results of the validation analysis, and so on.

Customers may be able to view the results of a validation workflow via a graphical interface. For example, a console UI may be used to present customers with a list of all resources within a server environment and analysis results for respective resources in the list. For example, the list may indicate that some resources can or cannot be deleted, according to a validated resource task. In various embodiments, if a resource is indicated as not being safe to delete, there may be additional information included indicating why the resource cannot be deleted, such as whether it failed an active capacity check, request check, or other checks that may be performed in a validation workflow.

In various embodiments, a customer selects one or more resources for deletion. A customer may review a list of resources that were validated as being either safe or unsafe to delete, and select some or all of the resources. In some cases, customers may review the reasons for which a resource is indicated as being unsafe to delete and then determine whether it is acceptable to delete such resources. For example, if an older version of a service is being deprecated and users have been instructed to migrate to a newer version of the service by a certain date or time, then it may be acceptable to delete resources associated with the older version at such point in time, even if some users have yet to migrate to the newer version of the service. Accordingly, various combinations of resources may be selected for deletion.

A customer may use a graphical console to select a set of resources for deletion and initiate a deletion workflow. A web service API to initiate a deletion may be submitted to a computing resource service provider via an API gateway. A serverless compute function may be executed and add the deletion request to a queue. The queue may comprise or otherwise indicate step functions workflows that are queued and executed when sufficient computing resources are available to run the step functions workflow. In various embodiments, a deletion workflow may refer to a soft deletion workflow or a hard deletion workflow, implementations of which are described in greater detail below.

In various embodiments, deletion of server environment resources comprises at least two steps—soft deletion and hard deletion. Soft deletion may refer to removal of resources from a server environment such that the resources are recoverable. In some cases, soft deletion of a resource disables or deactivates a resource but does not necessarily delete a resource. For example, a data object subject to soft deletion may be moved to a private or hidden location such that customer requests for the data object do not return the object and indicate the object was not found. The object, however, may still exist within the computing resource service provider, and may be recovered/restored by moving it back to the location where the data object was previously stored. Other recovery or restoration techniques may be applied. For a load balancer resource, the load balancer may, for example, be soft deleted by disabling or deactivating the load balancer and restored by re-enabling or reactivating the load balancer resource.

In various embodiments, a soft deletion step functions workflow comprises a set of tasks, some of which can be executed in parallel. A first task in the step functions workflow may be a serverless compute function to get the resources that are to be deleted. The resources to obtain may be specified by the customer's selection of various resources to be deleted. Resources identified for soft deletion may be organized by resource type. In various embodiments, the next step in a soft deletion step functions workflow comprises running resource type-specific soft deletion tasks. For example, there may be a first serverless compute function that performs soft deletions on a first type of resource (e.g., service deployment environment) and a second serverless compute function that performs soft deletion on a second type of resource (e.g., load balancer).

A resource type-specific soft deletion task may disable or deactivate specific instances of a particular type of resource. In some embodiments, soft deletion tasks fan out to resource type-specific soft deletion tasks that can be executed in parallel for difference instances of each resource type. For example, a first soft deletion of a first service deployment environment may be performed in parallel with a second soft deletion of a second service deployment environment.

An update soft deletion task may be performed to track the status of various resources. In various embodiments, resources are soft deleted and the soft deletion is recorded in a database. Customers may access dashboards and UIs that indicate the status of a resource—for example, a customer may be provided with status of a resource indicating that it was deleted on a first time (e.g., first UTC time), that it is scheduled to be permanently deleted at a second time (e.g., second UTC time after the first UTC time) and, in at least some cases, that the resource can be recovered or restored. A soft deletion step functions workflow may comprise a final task that notifies a customer when the soft deletion step functions workflow has been completed. In some cases, a status indicator is provided, such as whether the deletion was completed, whether some resources were not able to be deleted, the reasons why some resources could not be deleted (e.g., access denied), as well as other variations of the above.

In some embodiments, resources that have been soft deleted are not accessible/usable by customers. In at least some cases, resources that have been soft deleted can be recovered or restored. A customer may have access to a dashboard or console that provides the status of various resources within a service environment. The customer may be presented with information indicating the status of a resource and one or more options. For example, a resource's status may indicate the resource is deleted (e.g., soft deleted) and is scheduled to be permanently deleted at a time or date in the future. The customer may also be presented with an option to restore or recover the data. If a customer indicates that a resource should be recovered, a recovery step functions workflow may be executed. A customer may submit a request via an API gateway to perform a recovery. The request may be queued and then a delete recovery step functions workflow may be executed when sufficient resources are available. A delete recovery step functions workflow may comprise a first step to get or obtain the resource to recover. In some cases, recovery of a resource may involve the recovery of sub-resources. For example, if a service deployment environment is being recovered, VIPs for the service deployment environment may be identified as sub-resources that should be recovered. In various embodiments, resources to be recovered may be segregated by resource type, and resource type-specific recovery tasks may be executed. In at least one embodiment, each resource type-specific task is implemented as a serverless compute function that includes executable code that re-enables or re-activates a specific instance of a resource; the serverless compute function may receive, as an input, a resource identifier and then verify that the resource identifier matches the expected resource type, that the specified resource has been soft deleted or is otherwise in a disabled or deactivated state which can be re-enabled or reactivated, and then perform one or more steps to re-enable or reactivate the resource. In at least some embodiments, a hard deletion task that was scheduled in connection with a soft deletion task is terminated or canceled as part of a recovery workflow. Upon completion of a recovery task, a database may be updated to reflect the recovery status. For example, a database record may be updated to reflect that a resource that was deleted (e.g., soft deleted) has been recovered. When all resources specified in a delete recovery request have been processed, a final task of the step functions workflow may comprise a step to send a notification or email to the customer, indicating that the recovery request has been processed, whether it was successful, where to find results of the request, and so on.

In various embodiments, a hard deletion workflow permanently deletes a resource or otherwise deletes the resource in a manner that makes the resource unrecoverable. In some embodiments, when a resource is soft deleted, a hard delete workflow for the resource is queued or otherwise scheduled to be performed at a later point in time. This may be a predetermined period of time after the soft deletion is performed, for example, 15 days after soft deletion. This means that a resource that is deleted by the customer may be retained for a certain period of time before it is irrevocably removed.

In some embodiments, a dashboard or console provides the status of a resource. A resource may be shown as being deleted (e.g., soft deleted) and scheduled for permanent deletion at a certain date or time in the future. In some cases, a customer is able to manually initiate permanent deletion (e.g., hard delete) of a resource through the dashboard or console.

In various embodiments, hard deletion of a resource is performed as a hard deletion step functions workflow. When a resource is soft deleted, execution of the hard deletion step functions workflow may be scheduled for a future point in time or a predetermined time period after execution of the soft deletion. In various embodiments, a hard deletion step functions workflow comprises a first task to obtain or otherwise get the resource to be deleted. The resource may be deleted using a resource type-specific task that includes executable code to delete instances of a specific type of resource. A hard step functions workflow may comprise an update status task that is executed after completion of a hard delete resource task. The status of the resource may be updated in a database to indicate that the resource was permanently deleted, that permanent deletion failed (e.g., an error code providing information as to why the hard deletion failed), and so on. As a final step, a hard deletion step functions workflow may comprise a step to send a notification or email to the customer, indicating the outcome of an attempt to permanently delete a resource, such as, whether it was successful, where to find results of the hard deletion, and so on.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates a computing environment 100 in which unused resources of a service environment are cleaned up, in accordance with one or more example embodiments of the present disclosure. In various embodiments, client 102 submits a first web service API request to list or discover resources within a service environment, submits a second web service API request to validate whether various resources are safe to be deleted, and submits a third web service API request to delete resources and remove them from the service environment. Resources may be deleted in two stages, in various embodiments—a soft deletion stage in which resources are deactivated or disabled in a recoverable manner, and then a hard deletion stage in which resources are unrecoverably removed. Client 102, in some embodiments, has the ability to request recovery of resources prior to hard deletion being performed.

Client 102 may refer to a client computer system that interacts with a computing resource service provider. Client 102 may submit various requests or commands to computing resource service provider via an API gateway to manage the use of resources for a service environment hosted by a computing resource service provider. Client 102 may have access to a set of APIs to discover resources in a service environment, validate whether resources are unused, request deletion of unused resources, request the status of resources, request recovery of resources that have not been permanently deleted, and more.

In various embodiments, client 102 may submit a first API request 104 to discover resources in service environment. In some embodiments, the first API request 104 comprises an input parameter for which client 102 specifies an identifier for a root entity (e.g., service root identifier). In various embodiments, the request is received at an API gateway and a step functions workflow is executed to enumerate resources associated with the root entity. The enumerated resources may be associated with additional resources that are enumerated as well. For example, a root entity may be associated with a plurality of service deployment environments, each of which may be associated with respective pluralities of VIP load balancer, and so on. Accordingly, the discovery process may involve identifying resources of resources (e.g., sub-resources). All identified resources may be aggregated into a list or other suitable data structure and returned to client 102 in a response to the first API request. The list of resources may be stored in a database and client 102 may query the database for the list of resources in a service environment later on.

Client 102 may use first API request 104 or any other suitable mechanism to identify resources within a service environment. In some cases, client 102 lists or discovers all resources within a service environment and submits a second API request 106 to validate whether the resources of a service environment are unused. In some embodiments, the second API request includes an input parameter for a list of resources to validate. When a resource is validated, the status of the resource may be determined. Validation of whether resources are used or unused (e.g., to determine whether it is safe to delete various resources) may be performed using techniques described in connection with FIG. 3.

In various embodiments, client 102 submits a second API request 106 to validate whether a list of resources are unused. The second API request may be received at an API gateway of a service provider and queued for execution using a distributed message queuing service. The distributed message queuing service may be used to schedule the execution of various asynchronous workflows. When sufficient resources are available, a validation step functions workflow may be executed to validate the status of the list of resources (e.g., determine whether the resources are unused). In various embodiments, the list of resources are segregated by resource type, and resource type-specific validation tasks are executed to determine whether specific instances of resource types are safe to delete. In various embodiments, each resource type-specific validation task comprises one or more checks that are used to determine whether a particular resource is being used. In various embodiments, the results for each resource are recorded to a database with a status indicating whether a resource is safe to delete, and in some cases, additional information regarding which checks—if any—a resource failed to pass. The additional information regarding which checks a resource failed to pass may be used by the client 102 to prepare resources for deletion, for example, by performing steps that will cause the failed check to pass. A validation workflow may be implemented in accordance with techniques described in connection with FIG. 3.

In various embodiments, a client submits second API request 106 to the server with a list of resources to validate. The request may be received and processed via an API gateway to execute a serverless compute function that queues a validation step functions workflow for execution and is subsequently executed based on availability of computing resources. As part of the validation step functions workflow, the status of each listed resource is validated to determine whether the resources are safe to be deleted. In various embodiments, resource type-specific validation tasks are used to determine whether various types of resources can be safely deleted based on a set of checks that determine various ways in which a type of resource could be utilized in a service environment. In various embodiments, when the status of resources are validated, the status (e.g., safe to delete, not safe to delete) is recorded to a database in association with the resource. Client 102 may receive a notification (e.g., over email) when a validation step functions workflow has been executed to completion. Upon receipt of the notification, client 102 may access a dashboard or console to view the results of the validation step functions workflow, such as whether various resources were validated to be safe to delete, according to a set of resource type-specific checks.

Client 102 may interact with a GUI-based console or dashboard and select resources for deletion. The client 102 may choose resources based on status. For example, the user may check a set of resources whose status indicates that they are safe to delete. The user may additionally review resources that were marked as not being safe to delete and determine whether to override the status. For example, when a resource is deprecated, consumers of the resource may be given a certain period of time to migrate to an alternative resource. Once this period of time has passed, the resource may be safe to delete, even if it is still in use. Customers may use various criteria to determine whether a resource is safe to delete.

Client 102 may select a list of resources and submit them as part of a third API request 108 to delete the list of resources. This list may be different from the list referenced in numerals 104 and 106 above. The list of resources to be deleted may be selected by a customer reviewing the status of various resources and based on various criteria, such as whether the resource is marked as safe to be deleted and/or the reasons for which a resource status is not safe to be deleted. The status of a resource may be overridden by a customer through inspection. The list of resources to be deleted may be unused resources and/or resources that are safe to delete even if still in use.

Third API request 108 may be received at an API gateway and a serverless compute function may be invoked to queue a step functions workflow for soft deletion. A client request to delete a resource may be processed in two stages. In the first stage, the resource may be deleted in a recoverable manner, which may be referred to as a soft deletion. When a resource is soft deleted, it may be recoverable until a predetermined period in time, after which a hard deletion is performed which deletes the resources in an unrecoverable manner. If a recovery request is requested prior to the execution of hard deletion, the resource may be recovered or restored.

A soft deletion step functions workflow may comprise a set of serverless compute tasks. For the beginning of the task, the list of resources to delete may be obtained. Once the resources are obtained, they may be segregated or organized by resource type. The list of resources may be separated to a plurality of mutually exclusive subsets based on resource type. A resource type-specific soft deletion task may be executed for each resource type. A resource type-specific soft deletion task may include executable code that deactivates or disables an instance of a specific type of resource.

In some embodiments, when a resource is soft deleted, a database is updated to reflect the state of the resource. The resource may have a status indicating that it has been recoverably deleted, that the resource is scheduled to be permanently deleted at a specific date or time, and so on. Upon soft deleting a resource, a hard deletion task may be scheduled to delete the resource in an unrecoverable manner after a predetermined period of time has elapsed. The predetermined time may, for example, be a certain number of days after the soft deletion was performed, a certain number of days after the third API request 108 was submitted, and may be based on various criteria. For example, some types of resources may be recoverably deleted for a longer period of time than other types of resources.

A database record may be updated to reflect that a resource that was deleted (e.g., soft deleted) has been recovered. In some cases, the status of the resource may simply indicate that it is active or match the expected status had the resource never been deleted in the first place. In some cases, recovery of a base resource involves the recovery of multiple resources (e.g., sub-resources) that is performed in an atomic (e.g., all-or-nothing) manner wherein if the recovery of any of the multiple resources results in failure to recover the base resource, and each of the recoveries is rolled back (e.g., soft deleted again).

Once a resource has been soft deleted (e.g., in response to third API request 108), the resource may transition to a state where the resource is deactivated/disabled, the resource is recoverable, and the resource is able to be unrecoverably deleted. The resource may be in a state where it is not usable by client 102. For example, a service deployment environment that is soft deleted will appear as if deleted to the user, requests to a soft deleted load balancer VIP may indicate a failure, and so on. Resources subject to soft deletion may be disabled or deactivated so that they appear to client 102 as if they have been deleted. The resource may also be recoverable, for example, by client 102 submitting a stop deletion API request. The resource may also be subject to a hard deletion that unrecoverably deletes the resource. When a resource is soft deleted, a hard deletion task or workflow may be scheduled at a later point in time that is predetermined.

In FIG. 1, it is depicted that after a resource is soft deleted, there may be the ability to recover the deleted resource, in accordance with at least one embodiment. For example, service provider may monitor whether 110 a stop deletion request is detected. The stop deletion request may be detected when an API request is received indicating a stop deletion request and one or more resource identifiers of resources to recover. In response to receiving such a request, a task or workflow to recover resources 112 may be performed. However, if no recovery request is received, then the resources subject to soft deletion may be unrecoverably deleted 114 after certain conditions are met, such as the passage of a predetermined period of time.

The service provider may determine whether the stop deletion request was received before a predetermined period of time has elapsed or, more generally, whether a set of hard deletion criteria have been met. If a recovery request is received within a predetermined period of time, a resource that has been soft deleted (and not yet hard deleted) may be recovered. For example, a task or workflow may be invoked that re-enables or reactivates resources that were disabled or deactivated via soft deletion. The result of performing this recovery may be that the resource operates identically to as if the resource had not been subject to soft deletion and recovery.

Conversely, if no recovery request is received within a predetermined period of time, a resource that has been soft deleted may be subjected to hard deletion (e.g., step 114) wherein the resource is unrecoverably deleted. A resource that is unrecoverably deleted may be permanently removed from a service provider environment, overwritten, reallocated for use by other services or resources in the context of the service provider, and more. In some cases, unrecoverable deletion renders a resource unusable, for example, through the destruction of cryptographic material that may be required for performing various functionality. As an example, unrecoverable deletion of a digital certificate may involve the destruction of a private key from a security module such as a hardware security module (HSM) or trusted platform module (TPM) that is used to sign the digital certificate and generate attestations of ownership or control of the digital certificate.

Figure 2:
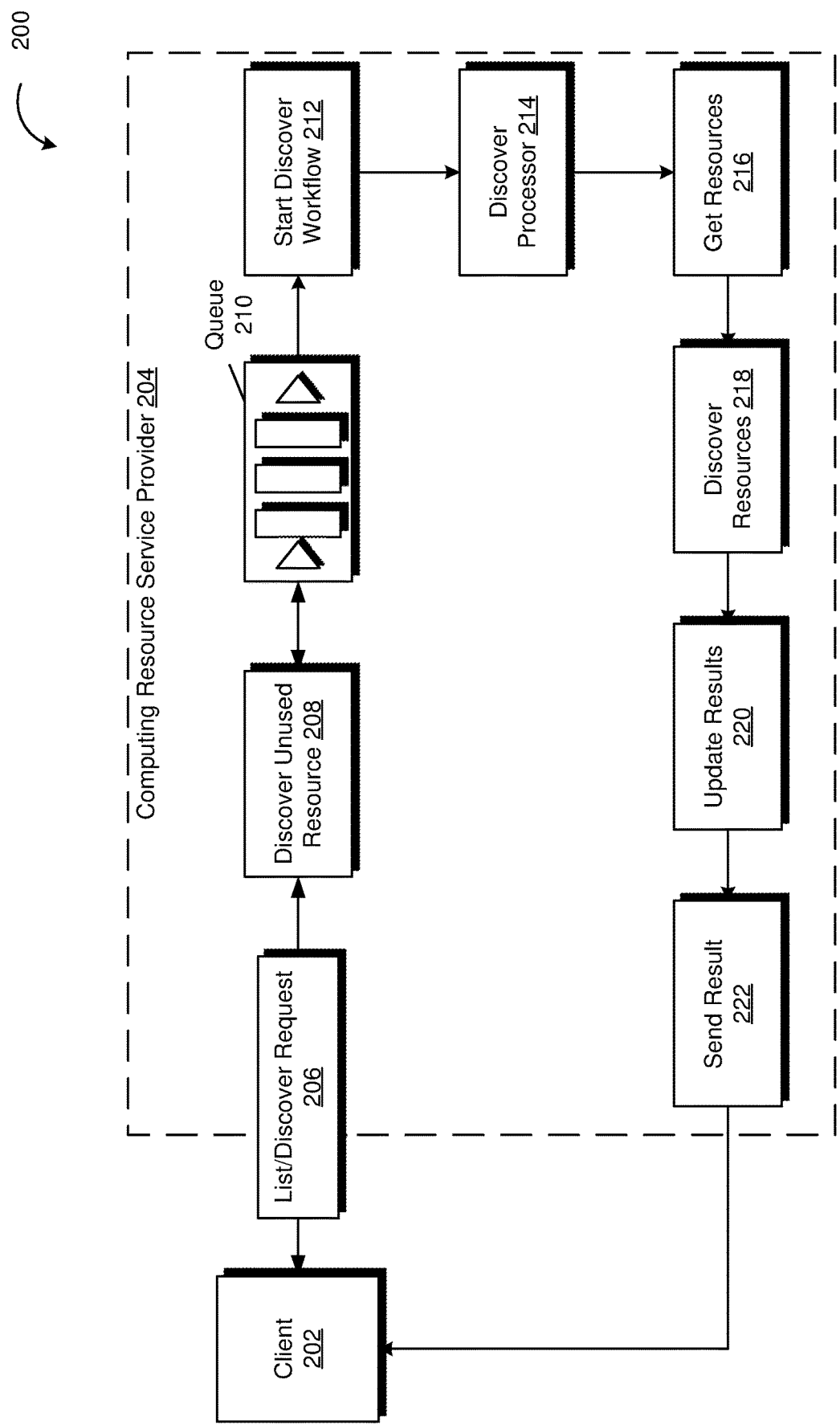
FIG. 2 illustrates a computing environment for discovering a list of resources in a service environment, according to at least one embodiment.

FIG. 2 illustrates a computing environment 200 for discovering a list of resources in a service environment, according to at least one embodiment. Techniques described in connection with FIG. 2 may be utilized in the context of FIG. 1 to discover a list of computing resources within a service environment. A list workflow—which may also be referred to as a discovery workflow—may refer to the execution of a series of tasks that find resources associated with a service environment and inventories the resources and descriptions of the resources in a database, which may subsequently be used for validation and deletion workflow.

Client 202 may refer to any suitable client such as a client computer system that stores executable code to submit API requests to a service provider. Client 202 may communicate with computing resource service provider 204 via any suitable network such as the Internet. Client 202 may submit requests such as a discover request 206 to computing resource service provider 204 in the form of API requests or commands.

A discover request 206 may be a web service API request (e.g., REST API) that is submitted by client 202 to find resources associated with a service environment and inventories the resources and descriptions of the resources in a database, which may subsequently be used for validation and deletion workflow.

In various embodiments, discover request 206 is received at an API gateway and causes execution of a serverless compute function to discover resources 208. Discover resources 208 may refer to a serverless compute function that queues a discover resources workflow or task for execution. Discover resources 208 may add a discover resources step functions workflow to queue 210. Queue 210 may refer to a distributed message queuing service. The distributed message queuing service may be used to schedule the execution of various asynchronous workflows.

Queue 210 may operate in a first-in-first-out (FIFO) or generally-FIFO order. When it is the discover resources workflow's turn, the start discover workflow 212 may be invoked. The discover resources workflow may be a step functions workflow that is represented as a state machine where states correspond to serverless compute functions or discrete tasks and state transitions coordinate the execution of the serverless compute functions within the state machine. For example, discover process 214 may be executed as a precursor step in the step functions workflow to validate that an existing service environment has been specified. In various embodiments, a client initiates a discover workflow by specifying an identifier for a root entity such as a service root identifier in a list or discovery request. If the discover processor 214 step passes, the step functions workflow may proceed to a get resources 216 step. In some embodiments, an identifier for a root entity such as a service root identifier is specified. Discover resources 218 may involve enumerating through all resources associated with a root entity and a set of properties are determined for each enumerated resource. The resource properties may include a resource name, resource type, resource namespace, and resource identifier. The resource properties may be recorded in a database and queried later for validation or deletion. Enumerated resources may include additional resources themselves (e.g., sub-resources) and resource properties for those additional resources may also be collected. This process may be performed in an iterative fashion to discover all resources, sub-resources, sub-resources of sub-resources, etc. associated with a root entity.

Update results 220 may refer to a serverless compute function that records the results of the discover resources tasks in a database. The database may be viewed by client 202 to determine a list of resources that are existing within a service environment, which may be used or unused. The list of resources discovered in a service environment may be utilized for downstream workflows to validate whether certain resources are being used and/or to delete resources that are unused.

Send result 222 may refer to a serverless compute service that notifies client 202 of completion of the discover request 206. The result may be transmitted as an email notification or any other suitable notification mechanism.

Figure 3:
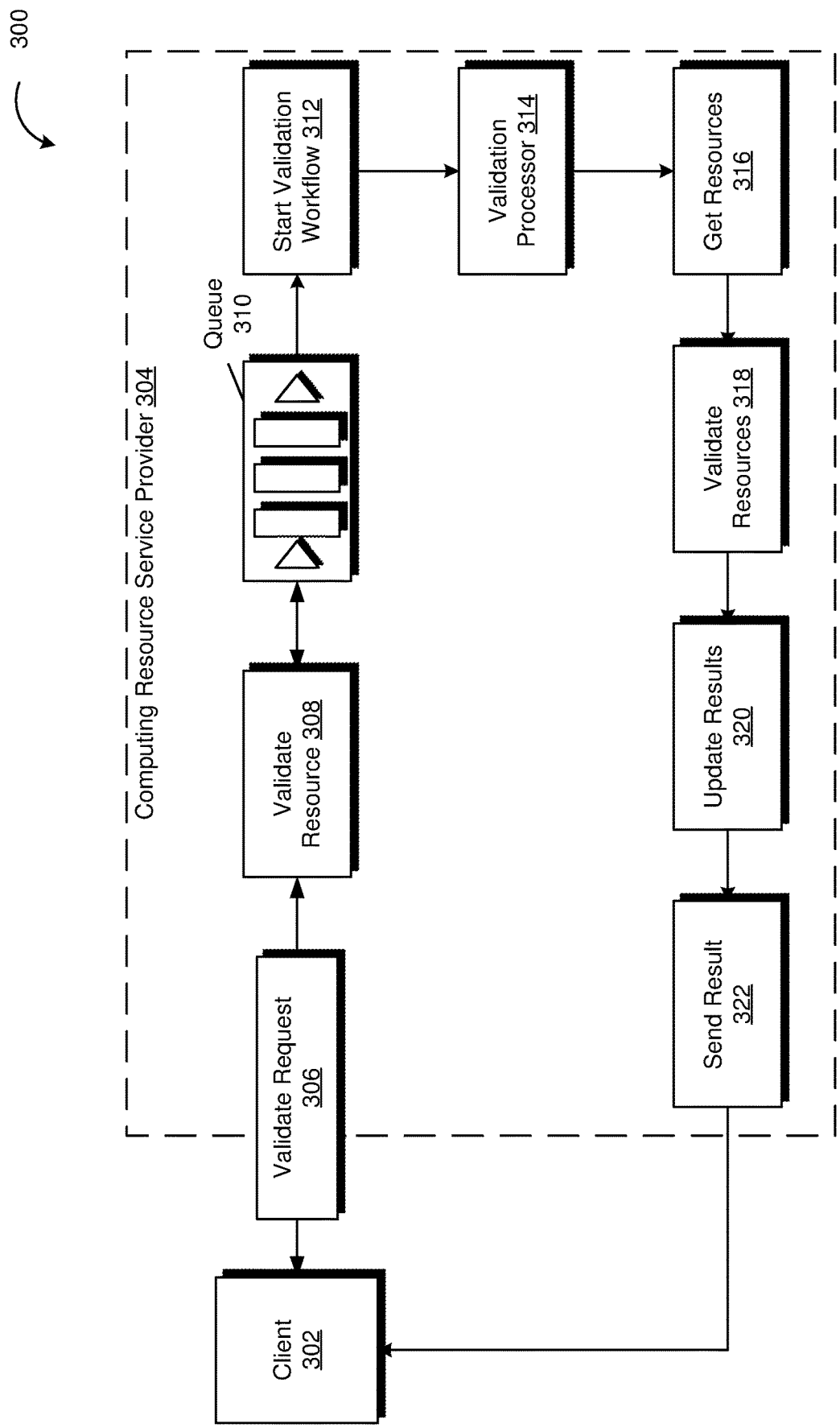
FIG. 3 illustrates a computing environment for validating the status of a list of resources, according to at least one embodiment.

FIG. 3 illustrates a computing environment 300 for validating the status of a list of resources, according to at least one embodiment. Techniques described in connection with FIG. 3 may be utilized in the context of FIG. 1 to validate the status of resources within a service environment.

Client 302 may refer to any suitable client such as a client computer system that stores executable code to submit API requests to a service provider. Client 302 may communicate with computing resource service provider 304 via any suitable network such as the Internet. Client 302 may submit requests such as a validate request 306 to computing resource service provider 304 in the form of API requests or commands.

A validate request 306 may be a web service API request (e.g., REST API) that is submitted by client 302 to validate a list of resources. A list of resources may refer to any suitable data structure that encodes or identifies a set of resources. For example, a list of resources may be implemented using an array, vector, list, queue, stack, queue, linked list, etc. and may encode resource identifiers to the resources to validate, or may encode other information that identifies such resources. For example, the request may encode a network location of a flat file where the resources to validate may be found, may encode a service environment identifier indicating that all resources within that service environment should be validated, may encode a query of a database whose results include the resource to validate, and so on.

In various embodiments, validate request 306 is received at an API gateway and causes execution of a serverless compute function to validate resources 308. Validate resources 308 may refer to a serverless compute function that queues a validation workflow or task for execution. Validate resources 308 may add a validation step functions workflow to queue 310. Queue 310 may refer to a distributed message queuing service. The distributed message queuing service may be used to schedule the execution of various asynchronous workflows.

Queue 310 may operate in a first-in-first-out (FIFO) or generally-FIFO order. When it is the validation workflow's turn, the start validation workflow 312 may be invoked. The validation workflow may be a step functions workflow that is represented as a state machine where states correspond to serverless compute functions or discrete tasks and state transitions coordinate the execution of the serverless compute functions within the state machine. For example, validation process 314 may be executed as a precursor step in the step functions workflow to validate that the list of resources is non-empty, that the resources being validated have corresponding validation tasks, and so on. If the validation processor 314 step passes, the step functions workflow may proceed to a get resources 316 step where the resources of the list are segregated based on resource type. For example, service deployment resources are grouped together in a first sub-list, load balancer VIPs are grouped together in a second sub-list, and so on. Validate resources 318 may involve the execution of resource type-specific validation tasks for each of the aforementioned sub-lists. Resource type-specific validation tasks are serverless compute functions that include executable code that, if executed, performs resource type-specific checks for their respective resource types. Each resource type may have its own resource type-specific checks that are applicable to the specific resource type and not applicable to other resource types.

Update results 320 may refer to a serverless compute function that records the results of the validated resources tasks in a database. The database may be viewed by client 302 to determine the status of various resources, such as whether the resource is safe to delete (e.g., passed all checks), the reasons that the resource is not safe to delete (e.g., enumerating each of the checks that a resource failed), and so on. The validation status of a resource may be reviewed by a client during an analysis of resources to determine which resources to delete. In some cases, the user may override a validation status based on knowledge of how a resource should behave. For example, in some cases, a service is being sunset and customers have been instructed to migrate to an updated version of the service. In some cases, it may be acceptable to delete resources for the service being sunset even when the resources are in use if the customers have been notified of the transition path and date at which the older version of the service will no longer be supported.

Send result 322 may refer to a serverless compute service that notifies client 302 of completion of the validate request 306. The result may be transmitted as an email notification or any other suitable notification mechanism.

Figure 4:
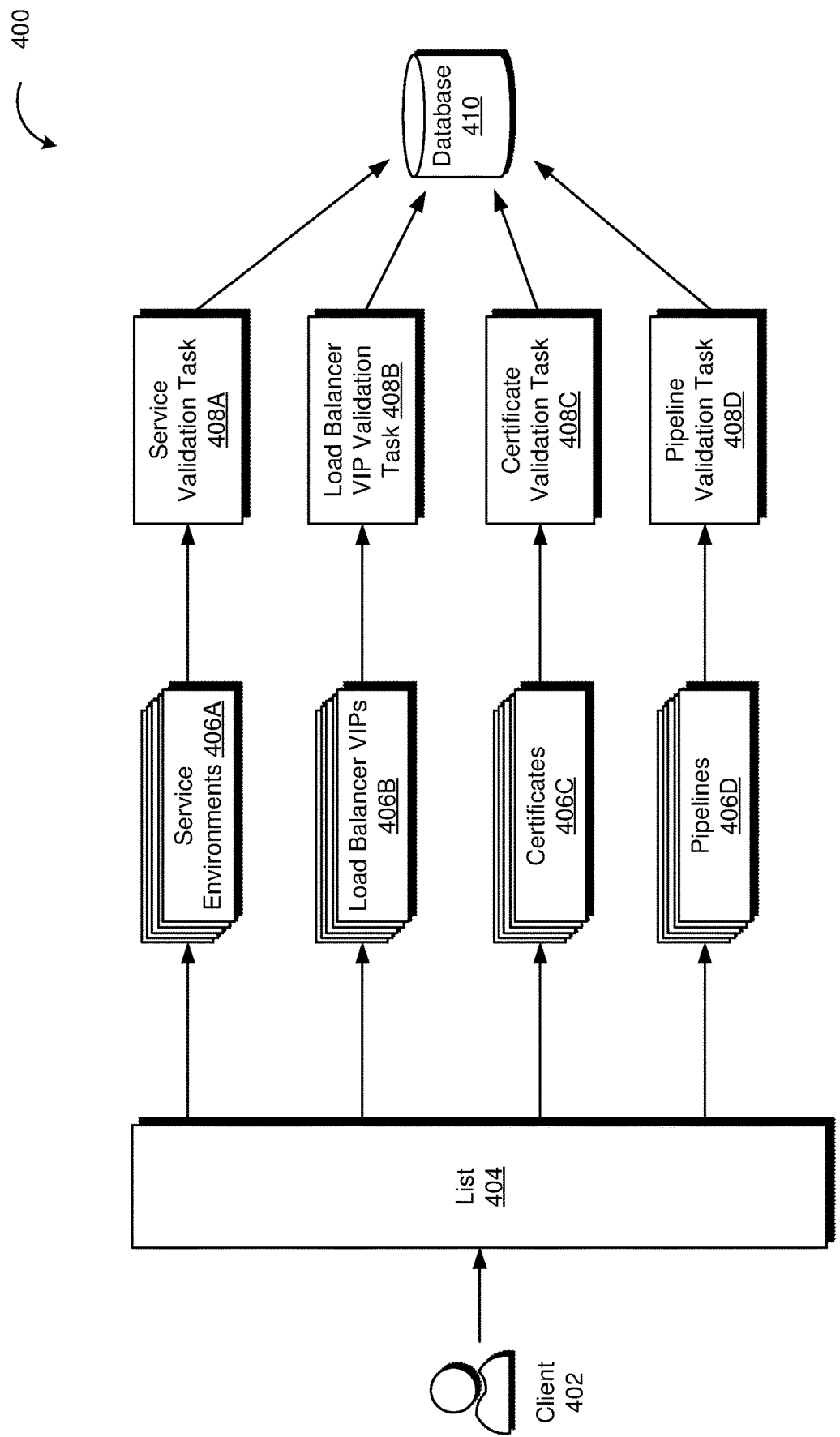
FIG. 4 illustrates a computing environment utilizing multiple resource type-specific validation tasks to validate the status of a list of resources, according to at least one embodiment.

FIG. 4 illustrates a computing environment 400 utilizing multiple resource type-specific validation tasks to validate the status of a list of resources, according to at least one embodiment. A client 402 may submit a request specifying an input list 404 of resources and resources of the list may be analyzed to determine their status with respect to whether they are safe to be deleted. The resources in the list may be segregated by type—for example, list 404 may be segregated by resource types 406A, 406B, 406C, 406D, etc. and resource type-specific validation tasks 408A, 408B, 408C, 408D, etc. may be used to validate the status of each type of resource in the list. The results of the validation tasks may be aggregated and stored in a database 410. The client 402 may receive a notification when the validation workflow is completed and retrieve the results from database 410.

In at least one embodiment, client 402 refers to a client computer system of a computing resource service provider. In some embodiments, client 402 submits an API request to computing resource service provider to validate resources. The request may encode, as an input parameter, a list 404 of resources. List 404 may be encoded as any suitable data structure. List 404 may encode resource name identifiers that uniquely resolve to an instance of a resource. For example, list 404 may be a list of resource IDs. The resources in list 404 may be resources of a specific service environment.

List 404 may be segregated (e.g., organized) by resource type. For example, list 404 may be enumerated and resource types for each element of list 404 may be determined. For example, all service deployment environment resources 406A of list 404 may be grouped together, all load balancer VIP resources 406B of list 404 may be grouped together, all certificates 406C of list 404 may be grouped together, all pipelines 406D of list 404 may be grouped together, and so on. List 404 may include other types of resources and may be grouped together similarly to the resource types described above.

Each resource type may be associated with a corresponding resource type-specific validation task, such as 408A-D illustrated in FIG. 4. For example, service deployment environment resources 406A may be associated with a service deployment environment validation task 408A, load balancer VIP resources 406B may be associated with a load balancer VIP validation task 408B, certificate resources 406C may be associated with certificate validation task 408C, pipeline resources 406D may be associated with pipeline validation task 408D, and so on.

In various embodiments, a resource type-specific validation task refers to a validation check is performed against an instance of a specific type of resource and determines whether a resource can be safely deleted. These checks may be specific to each resource type. Examples of resource types for which validation checks may be performed against may include one or more of: service deployment environment; load balancer virtual IP (VIP); digital certificates; pipelines; material sets for electronic storage and retrieval system for data objects, packages and version sets, distributed job scheduler (DJS) jobs, service provider accounts, host classes; and combinations thereof. A resource type-specific validation task may be implemented as a serverless compute function that is executed as part of a step functions workflow.

In at least one embodiment, a resource type-specific validation task for a service deployment environment comprises a series of checks that collectively validate whether a specific service deployment environment is in use. A resource identifier for a service deployment environment may be provided to the task. The task may perform the checks for each stage of a given service deployment environment. If at any stage a check fails, then the service deployment environment is considered to be in use and marked as being not safe to delete. In some embodiments, information relating to why a resource is not safe to delete (e.g., identifying a specific check of a specific stage of a service deployment environment that failed) may be logged and provided to the customer, and the customer may determine whether to nevertheless override the validation check and delete the resource. In at least one embodiment, a task to validate a service deployment environment comprises one or more of the following checks: active capacity check; VIP request check; active deployment check; and consumable check. Each of these checks may be performed for each stage of a given service deployment environment.

An active capacity check may be a check that validates whether there is any active capacity being used in a service deployment environment. If the active capacity is zero, then the active capacity check passes; if the active capacity is greater than zero, then the active capacity check fails; if no stage is present for the service deployment environment, then the check is skipped.

A VIP request check may be a check that validates whether a VIP is attached to a service deployment environment serving active client requests. In at least one embodiment, the VIP request check passes if the request sum is zero in the last 30 days, fails if the request sum is greater than zero, and is skipped if no VIP is present in the service deployment environment. The VIP request check may use a configurable time duration that is longer or shorter than 30 days, and may be a user-configurable setting.

An active deployment check may be a check that validates whether a service deployment environment has had a recent deployment. In at least one embodiment, the active deployment check passes if there have been zero deployments in the past 15 days, fails if there have been more than zero deployments, and is skipped if no stage is present for the service deployment environment. As with the VIP request check, the time period over which active deployments are searched over may be user-configurable and may be longer or shorter than the illustrative example of a 15 day deployment window.

A consumable check may be a check that validates whether a service deployment environment is being used as a consumable by other environments. In at least one embodiment, the consumable check passes if the service deployment environment is not being used by any other environment, fails if it is, and is skipped if no stage is present for the service deployment environment.

In at least one embodiment, a resource type-specific validation task for a load balancer virtual IP (VIP) may be used to determine whether it is safe to delete a VIP. This validation task may be performed for each VIP. A validation task may comprise a series of checks including one or more of: metrics check; alarm check; code check; certificate check; host check; CNAME check; reverse resolve check; and globalized VIP check. A VIP metrics check may be used to determine whether any requests were sent to the VIP in a predetermined period of time (e.g., 7 days). Metrics used for this check may be different for each type. For example, for TCP VIP, client connections may be the data point that is checked; for HTTP/SSL, the data point being checked may be the total requests per second. The metrics check may pass if the sum of data points is zero and fail if it is greater than zero. An alarms check may check whether there are any alarms associated with the fully qualified domain name (FQDN) of the VIP. If there are no matches, then the check passes, but if there are any matches, the check fails. A code check may check whether the FQDN is defined in any code or configuration files. If any matches are found, the code check fails, but if none are found, the code check passes. A certificate check may check whether there are any active certificates present in a certificate manage associated with the VIP. If none are found, the certificate check passes, but if any are found, it fails. A host check may check whether the FQDN belongs to the host. If not found, the host check passes, but if it is found, the host check fails. A canonical name record (CNAME) check may check if FQDN resolves to a CNAME. A CNAME may refer to a type of resource record in a Domain Name System (DNS) that maps one domain name (e.g., an alias) to another (e.g., the canonical name). If the FQDN does not resolve to a CNAME, the CNAME check passes, but if it does resolve to DNS, the CNAME check fails. A reverse resolve check may check whether the FQDN resolves to an IP and the reverse. If the FQDN resolves to IP and IP resolves to FQDN, then the reverse resolve check fails, but if it resolves to CNAME, the check fails. A globalized VIP check may check whether the VIP is globalized. If it is globalized, the customer may receive an indication to unglobalize the VIP before deleting it.

In at least one embodiment, a resource type-specific validation task for a digital certificate (e.g., type of resource) may be used to determine whether it is safe to delete a digital certificate issued by the computing resource service provider. The digital certificate may have a root certificate that is signed or otherwise attributable to the computing resource service provider or component thereof (e.g., certificate manager). In at least one embodiment, a digital certificate validation task comprises one or more of the following checks: expiry metrics check; and distribution check. An expiry metrics check may be used to determine whether the certificate is publishing metrics. If metrics are not being published, then the check passes, but if metrics are being published, the check fails. A distribution check may be used to determine whether the certificate is being used in a VIP or host within chain. If it is being used in SSL VIP check if SSL VIP is active and bind status. If being used as host within chain, then check if there are any destinations attached.

A pipeline may be a type of resource with a resource type-specific validation task. The pipeline validation task may verify whether the pipeline has had recent code changes or version set builds within a specified period of time (e.g., 15 days). If none, then the check passes, but if there are any recent builds within the specified period of time, then the check fails. A second check of a pipeline validation task may be a live pipeline template (LPT) check that checks whether the pipeline is built using LPT. Since LPT may be used to create pipelines using code, even if it is deleted it will again be deleted using synthesis. In some embodiments, these need to be removed from LPT. An LPT check may pass if the pipeline is not managed by LPT and fail if it is.

Results of resource type-specific validation tasks 408A-D may be recorded in database 410. In some embodiments, a validation status is recorded in database 410 for each element of list 404. Database 410 or any suitable data store for structured or unstructured data may be used to store the validation status for resources in list 404. In various embodiments, a notification such as an email is sent to client 402 when all resources in list 404 have been validated.

Figure 5:
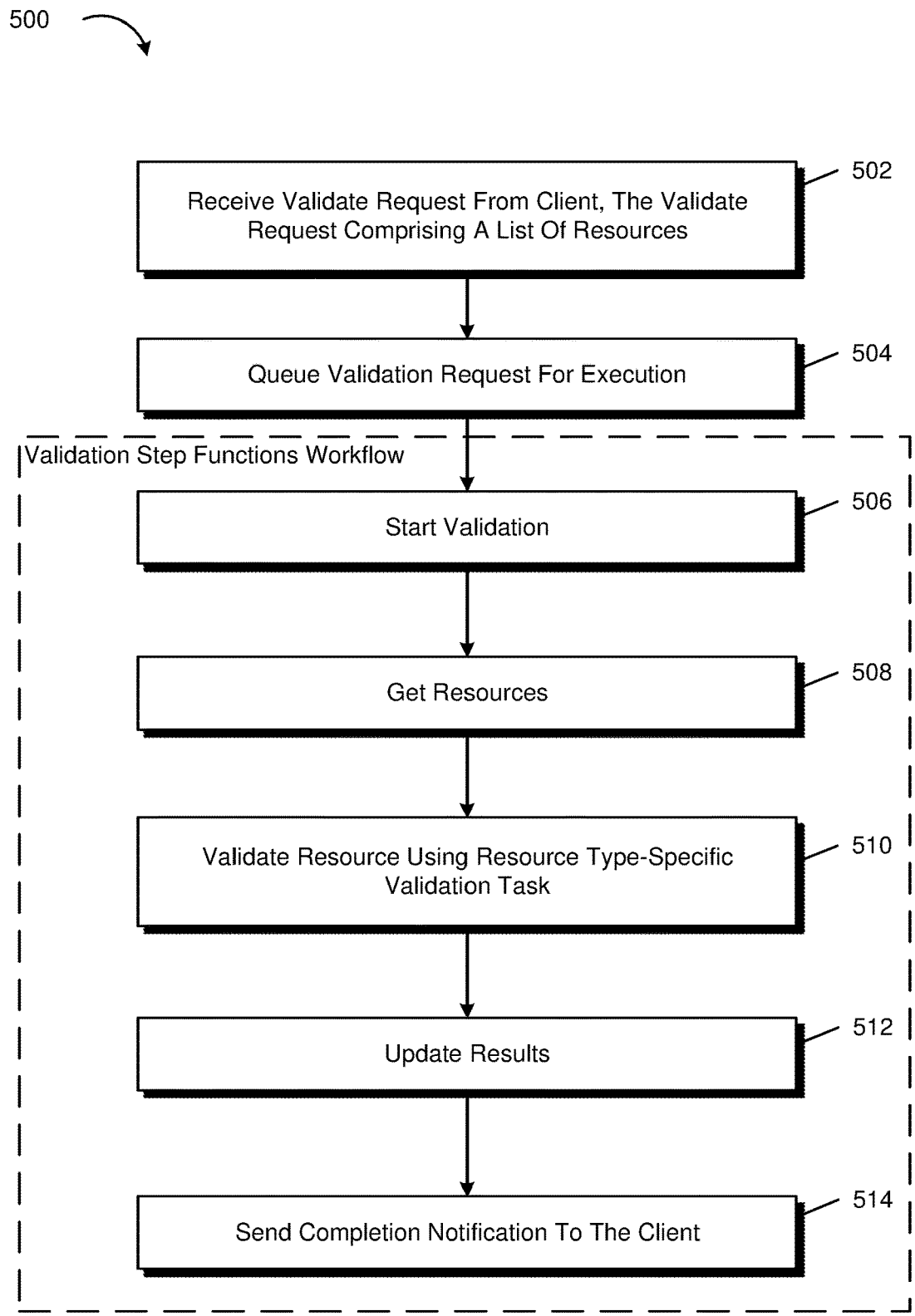
FIG. 5 shows an illustrative example of a process for validation of resources in a service environment, in accordance with one or more example embodiments of the present disclosure.

FIG. 5 shows an illustrative example of a process 500 for validation of resources in a service environment, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1 and 8. In at least one embodiment, process 500 or a portion thereof is implemented by a computing resource service provider.

A system performing process 500 may comprise a step to receive 502 a validation request from a client, the request comprising a list of resources of a service environment, according to at least one embodiment. The validation request may be a web service API request received at an API gateway of a computing resource service provider. In various embodiments, the request may be subject to authentication and/or authorization checks. If the client is successfully authenticated and security policies indicate that the client is authorized to have the request fulfilled, process 500 may proceed. Otherwise, the request may be rejected with an appropriate response indicating failure to fulfill the request.

A system receives a validation request from a client for a list of resources in a service environment. A system performing process 500 may queue 504 the validation request for execution, according to at least one embodiment. A request received via an API gateway may invoke a serverless compute function to queue a validation task or workflow for asynchronous execution. In some embodiments, performance of a validation request may be performed synchronously. The queue may include various tasks or workflows that are executed in a first-in-first-out (FIFO) or generally-FIFO order based on availability of computing resources to fulfill the queued requests.

In some embodiments, the queue validation request is removed from the queue and processed. Processing of the queued validation request may involve the execution of a validation step functions workflow. A step functions workflow may be implemented as a state machine with a set of states that correspond to serverless compute functions and edges that are used to coordinate execution of the serverless compute functions to perform a larger workflow. For example, successful execution of one serverless compute function may cause a state machine transition that causes execution of another serverless compute function.

A system performing process 500 may start 506 validation. The start validation step may comprise any precursor steps or validation of input parameters that are used in the execution of the step functions workflow. A list of resources may be validated to be non-empty, exclusively include resource of a particular service environment, and so on. In various embodiments, the system may get 508 or obtain resources from the list of resources. The list of resources may include various types of resources such as a service deployment environment, load balancer VIP, digital certificate, and more. The list of resources may include several instances of different types of resources. The list may be segregated by resource type. For example, the list may be partitioned into a first subset of a first resource type, a second subset of a second resource type, etc. such that each subset is mutually exclusive from every other subset and that the subsets collectively form the list of resources without duplicates.

A system performing process 500 may validate 510 resources using resource type-specific validation tasks. For example, a service deployment validation task may be a serverless compute function that is invoked once for each service deployment resource identified in the list, or may be invoked once for all service deployment resources. There may be a plurality of resource type-specific validation tasks. Resource type-specific validation tasks may be executed in parallel to one another and may not have any dependencies on one another. Validation checks such as those discussed in connection with FIG. 3 may be used to determine whether a resource is still in use in a service environment, whether a resource is safe to delete or not, and so on.

A system performing process 500 may update 512 results as the resource type-specific validation tasks are being executed, according to at least one embodiment. Validation status of a resource may be recorded in a database and indicate whether it is safe to delete a resource or not. For example, if a resource of a particular resource type passes all of the checks in the corresponding resource type-specific validation task, the validation status for that resource may indicate that it is safe to be deleted and/or that it is unused in the service environment. Conversely, if a resource fails one or more checks of a resource type-specific validation task, then the reason(s) for failure may be recorded, such as indicating non-zero capacity of a resource, that there are still requests being submitted to use the resource, and so on. The results may be updated as the validation tasks are being executed, so there may be multiple validation status updates to a database throughout execution of the validation step functions workflow.

A system performing process 500 may send 514 a completion notification to the client. The completion notification may be submitted to the client after all resources in the list have been validated. The completion notification may be sent to the client as an email, response to API request, in any other suitable manner, etc. Client may use the validation results from process 500 to determine whether it is safe to delete various resources in a service environment. Deletion of resources may be performed using processes described in connection with FIG. 6, in accordance with at least one embodiment.

Figure 6:
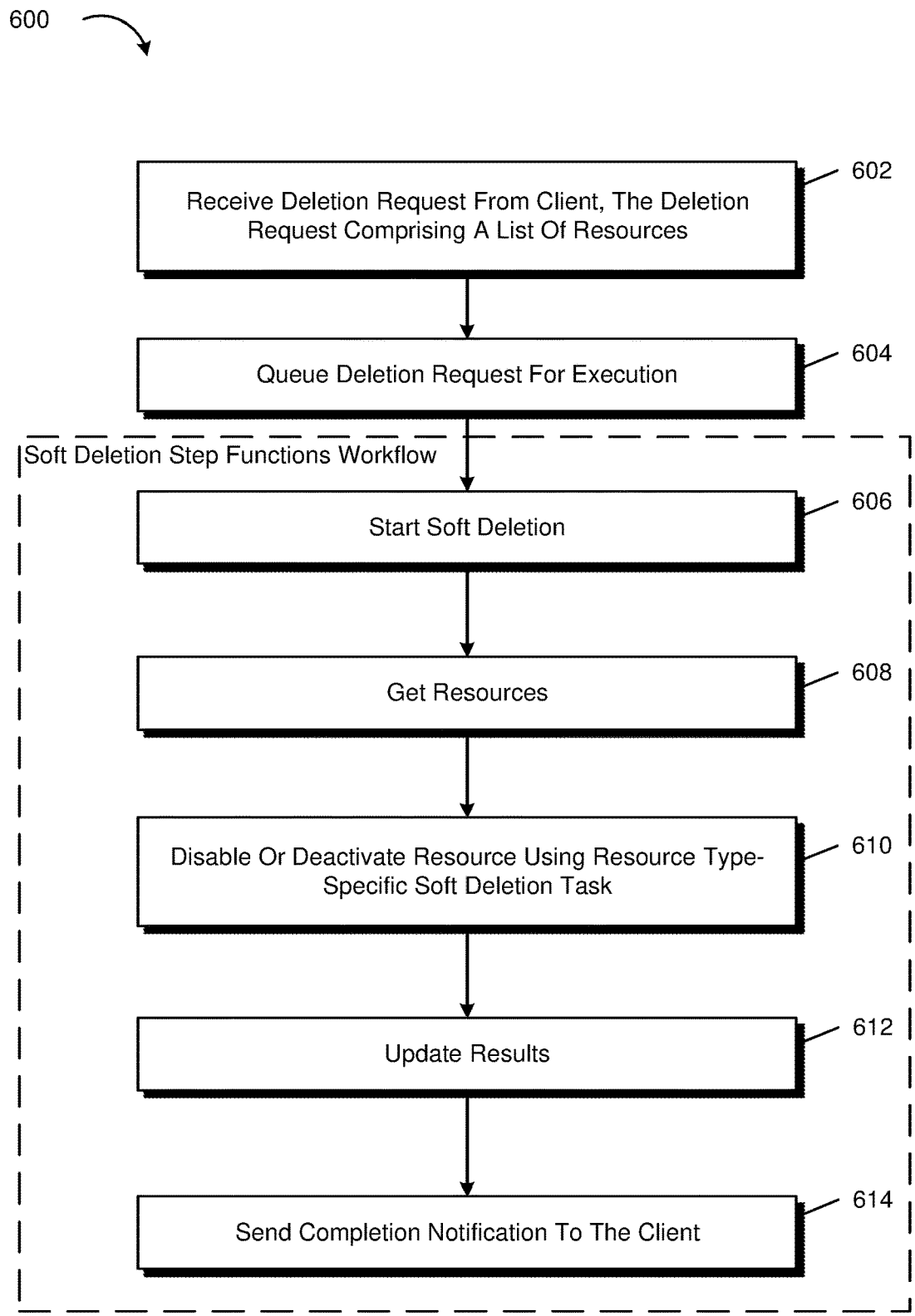
FIG. 6 shows an illustrative example of a process for recoverably deleting resources so that they cannot be used within a service environment (e.g., soft deletion), in accordance with one or more example embodiments of the present disclosure.

FIG. 6 shows an illustrative example of a process 600 for recoverably deleting resources so that they cannot be used within a service environment (e.g., soft deletion), in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1 and 7. In at least one embodiment, process 600 or a portion thereof is implemented by a computing resource service provider.

A system performing process 600 may comprise a step to receive 602 a deletion request from a client, the request comprising a list of resources of a service environment, according to at least one embodiment. The deletion request may be a web service API request received at an API gateway of a computing resource service provider. In various embodiments, the request may be subject to authentication and/or authorization checks. If the client is successfully authenticated and security policies indicate that the client is authorized to have the request fulfilled, process 600 may proceed. Otherwise, the request may be rejected with an appropriate response indicating failure to fulfill the request.

A system receives a deletion request from a client for a list of resources in a service environment. A system performing process 600 may queue 604 the deletion request for execution, according to at least one embodiment. A request received via an API gateway may invoke a serverless compute function to queue a deletion task or workflow for asynchronous execution. In some embodiments, performance of a deletion request may be performed synchronously. The queue may include various tasks or workflows that are executed in a first-in-first-out (FIFO) or generally-FIFO order based on availability of computing resources to fulfill the queued requests.

In some embodiments, the deletion validation request is removed from the queue and processed. Processing of the queued validation request may involve the execution of a soft deletion step functions workflow. A step functions workflow may be implemented as a state machine with a set of states that correspond to serverless compute functions and edges that are used to coordinate execution of the serverless compute functions to perform a larger workflow. For example, successful execution of one serverless compute function may cause a state machine transition that causes execution of another serverless compute function.

A system performing process 600 may start 606 soft deletion. The start soft deletion step may comprise any precursor steps or validation of input parameters that are used in the execution of the step functions workflow. A list of resources may be validated to be non-empty, exclusively include resources of a particular service environment, and so on. In some embodiments, the list of resources to perform soft deletion on are verified to still exist within the service environment. In various embodiments, the system may get 608 or obtain resources from the list of resources. The list of resources may include various types of resources such as a service deployment environment, load balancer VIP, digital certificate, and more. The list of resources may include several instances of different types of resources. The list may be segregated by resource type. For example, the list may be partitioned into a first subset of a first resource type, a second subset of a second resource type, etc. such that each subset is mutually exclusive from every other subset and that the subsets collectively form the list of resources without duplicates.

A system performing process 600 may disable or deactivate 610 resources using resource type-specific validation tasks. For example, a service deployment validation task may be a serverless compute function that is invoked once for each service deployment resource identified in the list, or may be invoked once for all service deployment resources. There may be a plurality of resource type-specific soft deletion tasks. Resource type-specific validation tasks may be executed in parallel to one another and may not have any dependencies on one another. Each resource type may be disabled or deactivated in a different manner and hence, different resource type-specific soft deletion tasks may be invoked for different resource types. Data for a resource that is being disabled or deactivated may be saved, moved, duplicated, or otherwise preserved. The data that is preserved may include sufficient information so as to restore the state and capabilities of the resource at the time that it is disabled or deactivated.

A system performing process 600 may update 612 results as the resource type-specific soft deletion tasks are being executed, according to at least one embodiment. Deletion status of a resource may be recorded in a database and indicate that a resource was recoverably deleted (e.g., disabled or deactivated). A dashboard or console may show resources that were soft deleted as being deleted, that the resource can be recovered, that the resource will be permanently deleted at a certain point in time after which recovery is no longer possible, or combinations thereof. The results may be updated as the soft deletion tasks are being executed, so there may be multiple soft deletion status updates to a database throughout execution of the soft deletion step functions workflow.

A system performing process 600 may send 614 a completion notification to the client. The completion notification may be submitted to the client after all resources in the list have been soft deleted. The completion notification may be sent to the client as an email, in response to API request, in any other suitable manner, etc. Client may use the soft deletion results from process 600 to view the status of various resources. For example, after a resource has been soft deleted, the client may receive notifications of unexpected failures that are attributable to the resource being deleted. In this case, the client may, due to the unexpected failures, request that the resource be recovered. If the recovery request is submitted prior to a predetermined period of time passing, or more generally, after a set of conditions for hard deletion have been satisfied, the resources that were disabled/deactivated in process 600 may be recovered. However, if no recovery request is received prior to a predetermined period of time passing, or more generally, after a set of conditions for hard deletion have been satisfied, the resource may have been unrecoverably deleted, in accordance with at least one embodiment. Recovery and/or unrecoverable deletion of resources may be in accordance with processes described in connection with FIG. 7.

When resources of a service environment are soft deleted, the soft deletion of the resources may be recorded in an event log and may be made available to other systems and services for triage and diagnosis purposes. For example, various resource management systems may be integrated with the recorded event data to help triage support issues. In some cases, a ticket may be received to investigate an outage or failure. If the outage or failure is related to not being able to access a resource that was soft deleted, such information relating to the soft deletion of the resource may be surfaced (e.g., provided as a notification) as a likely source of the outage or failure. In some embodiments, a recovery workflow is automatically initiated to restore the resource and resolve the outage.

Figure 7:
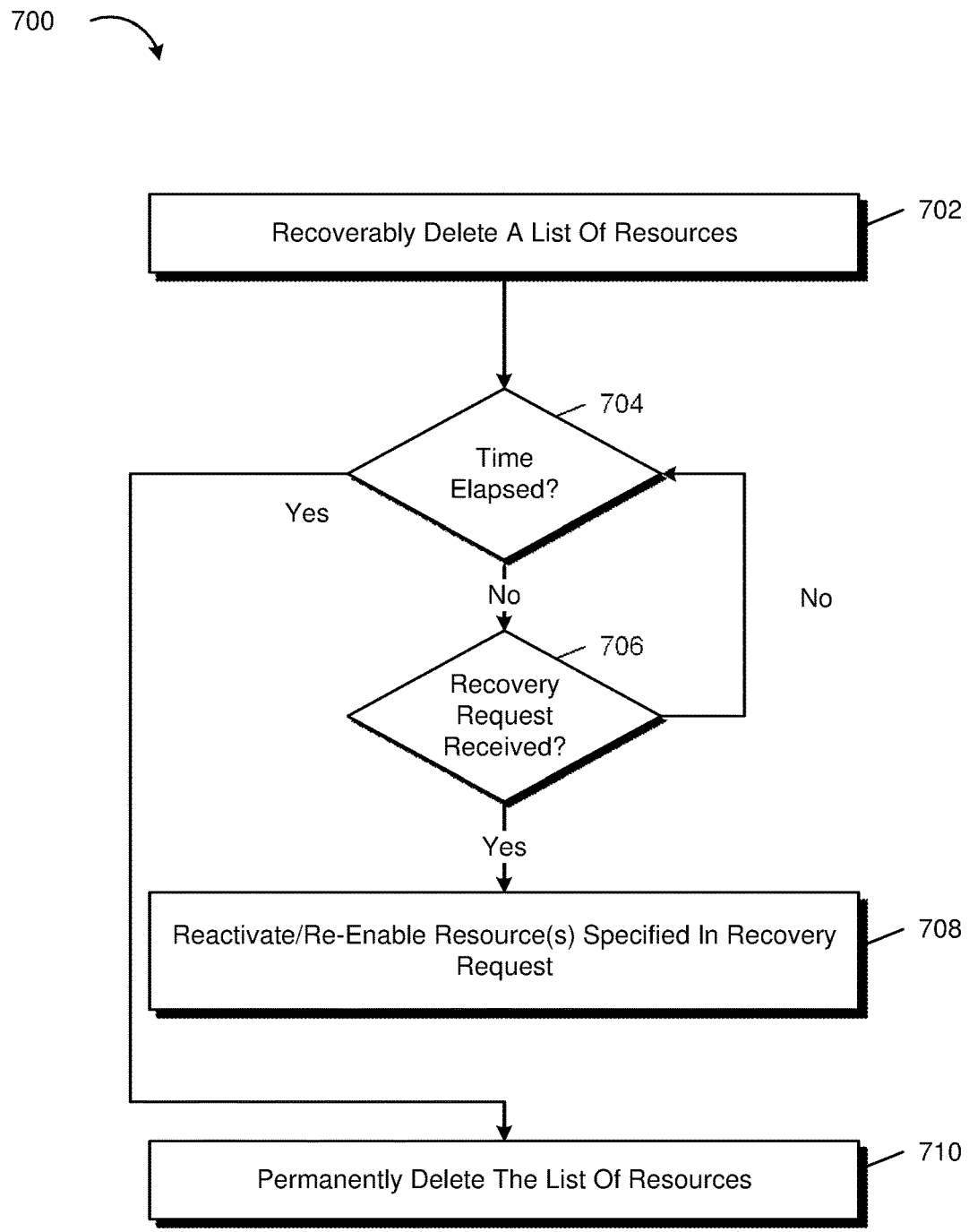
FIG. 7 shows an illustrative example of a process for recovery and/or unrecoverable deletion of resources in a service environment, in accordance with one or more example embodiments of the present disclosure.

FIG. 7 shows an illustrative example of a process 700 for recovery and/or unrecoverable deletion of resources in a service environment, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1 and 7. In at least one embodiment, process 700 or a portion thereof is implemented by a computing resource service provider.

A system performing process 700 may recoverably delete 702 a list of resources. The resources may be deleted according to a soft deletion process such as those discussed in connection with FIG. 6. When a resource is soft deleted, a hard deletion task or workflow may be scheduled for execution after a predetermined period of time or more generally, after a set of conditions are met. For example, the set of conditions may include a criterion that there are no attempts to use the resource after it has been soft deleted.

A system performing process 700 may wait for a predetermined period of time to pass. More generally, the system may wait for satisfaction of a set of conditions. If the time has elapsed 704 without any intervening recovery requests, the system may permanently delete 710 from the list of resources. A resource that is unrecoverably deleted may be permanently removed from a service provider environment, overwritten, reallocated for use by other services or resources in the context of the service provider, and more.

Prior to the period of time that has elapsed, the system may support recovery of resources subject to soft deletion. The system may be operable to receive recovery requests for resources. The system may determine whether 706 a recover request was received before the predetermined period of time. If no recovery request was received prior to the predetermined period of time elapsing, then the resource may be permanently deleted, as discussed in connection with step 710. However, if a recovery request was received prior to the time elapsing, then the system may reactivate/re-enable 708 for one or more resources specified in the recovery request. A resource may be reactivated or re-enabled by performing corresponding operations that negate the deactivation/disabling of a resource performed as part of a soft deletion. In some embodiments, data for a deactivated resource is stored or otherwise preserved in a network storage location that is hidden from the client. The recovery request may use this data to restore the state of the resource so that it is functionally the same as it was when the resource was deactivated.

In various embodiments, recovery of a resource (e.g., in response to a recovery request) may comprise a step to cancel or terminate a task that was scheduled to permanently delete the resource being recovered. For example, when a resource is soft deleted, a corresponding hard deletion task may be scheduled for execution at a later point in time. If a recovery request is received prior to when the hard deletion is scheduled to run, then the resource may be recovered and, as part of the recovery, the hard deletion task is removed from a queue, canceled, terminated, or otherwise obviated.

An event-driven serverless compute service may be utilized to invoke various serverless compute functions. An event-driven serverless computing service may receive and/or monitor events in the manner described above. In some embodiments, the serverless compute service is used to execute tasks of a step functions workflow. In various embodiments, step functions are used to orchestrate the execution of serverless resources and coordinate the execution of multiple serverless compute functions. Step functions may be used to keep individual serverless compute functions free of dependencies or additional logic by triggering and tracking each step of execution. For example, step functions workflow may be used to coordinate the execution of serverless compute functions into multiple stages.

The serverless compute service may be implemented in accordance with computing environments described in connection with FIGS. 1-8, and may be further configured to receive events from multiple requests for validation and deletion of server environment resources. The serverless compute service may receive the events and the event may indicate a serverless compute function to execute. For example, a first event identifier may correspond to a first serverless compute function, a second event identifier may correspond to a second serverless compute function, and so on.

Serverless compute functions may include executable code, source code, applications, scripts, routines, function pointers, input parameters to a routine, callback functions, API requests, or any combination thereof. As an example, the serverless compute service may include a mapping of events or endpoints to serverless compute functions. In at least one embodiment, serverless compute service detects event, maps the event to a particular serverless compute function, provisions resources for an execution environment for the serverless compute function, executes the serverless compute function in the provisioned execution environment, and then de-provisions the resources. The execution environment may be a containerized execution environment. In some embodiments, a virtual machine instance is provisioned and launched to execute the serverless compute function and terminated upon completion of the serverless compute function. In this way, compute resources may be utilized only for as long as necessary to execute the serverless compute function and made available for use by other (e.g., unrelated) tasks once the serverless compute function has been executed. "Serverless" functionality as described herein may refer to execution models in which a service (e.g., serverless compute service of a computing resource service provider) allocates computing resources on demand and manages the allocation, provisioning, de-provisioning, and de-allocation of compute resources on behalf of a client. For example, a client may provide instructions (e.g., in the form of a request) to execute a serverless compute function and a serverless compute service may determine an appropriate manner in which to execute the serverless compute function, which may involve steps to identify sufficient computing resources within a computing resource service provider to execute the serverless compute function, provisioning an environment appropriate for execution of the serverless compute function, causing execution of the serverless compute function, de-provisioning the environment, and then making the computing resources available to perform other (e.g., unrelated) tasks. Servers may be used in connection with the execution of serverless compute functions (e.g., to instantiate a containerized environment for running the serverless compute function).

Invoking a routine may include executing code or providing executable code as part of a request. Multiple events may be received by the serverless computing service and spliced such that a particular serverless computing function is run based on the type of error that caused the segment to have degraded quality. A first serverless compute function that is run in response to a first event may be different from a second serverless compute function that is run in response to a second event but need not be the case—the serverless compute function may, in some cases, be the same either literally (e.g., both events utilize a function pointer that runs the same executable code from memory) or logically (e.g., the same functional outcome). In some cases, the serverless compute function may use information included in the events to perform a step functions workflow.

A computing resource service provider may implement a certificate manager as a service that provisions, manages, and deploys public and private Secure Sockets Layer/Transport Layer Security (SSL/TLS) certificates for use with computing resource service provider services and internally connected resources. SSL/TLS certificates may be used to secure network communications and establish the identity of websites over the Internet as well as resources on private networks. A service provider certificate manager removes the need to perform manual processes such as purchasing, uploading, and renewing SSL/TLS certificates.

With a service provider certificate manager, customers are able to request a certificate, deploy it on certificate manager-integrated computing resource service provider resources, such as load balancers, content deliver networks, APIs on an API gateway, etc., and let service provider certificate manager handle certificate renewals. It also enables clients to create private certificates for internal resources and manage the certificate lifecycle centrally.

In an embodiment, a service root resource is a team-owned collection of related resources for which permissions should be managed as a single entity. Service root resources may operate with the following concepts: owner, resource, actors and permissions. In an embodiment, service root jurisdiction doesn't span into the service provider space. A service root resource can define who owns and who is authorized to use a service provider account, but it cannot tell a service of the service provider (e.g., a security token service) whether a role can be invoked by some service provider account, at least because this area of ownership is associated with another service, such as an identity access management service.

In an embodiment, there exist differences between service root identifiers and identity access management with regard to permissions management. In an embodiment, service root identifiers can manage permissions for a random numbers of actors such as the whole CDO, a team, a random number of individuals, a service provider account etc. In an embodiment, the identity access management service does not support the "Organization" type of principal (called "actor" in service root resources). It only supports a limited list of accounts/sub-accounts OR services. Although identity management service would still be needed as an extension into the service provider space, there would be a limited need to interact with it in various embodiments. For example the ownership change of a service provider account (managed by service root resources) would automatically reflect in the identity management service/security token service. Only the new owners would be able to assume a specific role. The users/roles/policies are likely to be created during the onboarding, and left unchanged ever after.

With regard to authoritative data stores, service root resources may be utilized. Service root resources may be the authoritative source for the Identity and permissions. Systems will likely call an authorization service to get the answer to "isAuthorized" or "canDeploy." CRL is the metadata authority. The information that needs to be shared between multiple systems can make use of CRL. However, things like Deployment Preferences will not be stored in CRL.

The examples presented herein are not meant to be limiting.

A computing resource service provider may provide a variety of services to its customers, and its customers may communicate with the computing resource service provider through an interface, which may be a web page or other type of customer interface. Each service of the services provided by the computing resource service provider may have its own interface and subsets of the services may have corresponding individual interfaces in addition to or as an alternative to a common interface. A customer may communicate with the computing resource service provider through a network, such as the Internet or intranet. Customers may submit requests to a computing resource service provider via service provider API requests or commands. In some cases, clients submit web service API requests to a computing resource service provider as a representational state transfer (REST) or REST-ful API request. In some cases, requests are HTTP-based APIs requests.

The computing resource service provider may also provide various computing resources and services to its customers, individually or in combination with other resources and services, and the computing resource service provider may further provide those services to the customer through a distributed computing environment. The services provided by the computing resource service provider may include services such as virtual computer system services, block-level data storage services, cryptography services, on-demand data storage services, notification services, authentication services, policy management services, task services and archival data storage services. Not all embodiments described include all the services described, and additional services may be provided in addition to or as an alternative to services explicitly described.

Services provided by a computing resource service provider may include interfaces that enable a customer to submit requests, for example, through appropriately configured API calls, to the various services. In addition, each of the services may include service interfaces that enable the services to communicate with or access each other (e.g., to enable a virtual computer system of the virtual computer system service to store data in or retrieve data from an on-demand data storage service and/or access block-level data storage devices provided by a block-level data storage service). Each of the service interfaces may also provide secured and/or protected access to each other through the use of encryption keys and/or other secured access methods, thereby enabling secure and/or protected access between them. Collections of services operating in concert on a distributed computer system may have a single front-end interface and/or multiple interfaces between the elements of the distributed computer system.

A computing resource service provider may provide a virtual computer system service that may be a collection of computer resources configured to instantiate virtual machine instances on behalf of the customer. The customer may interact with the virtual computer system service to provision, place and operate virtual machine instances that are instantiated on computer systems operated by the computing resource service provider. The virtual machine instance may be used for various purposes, such as to operate as servers supporting a website, to operate business applications, or, generally, to provide computing power to the customer. Other applications for the virtual machine instances may be to support database applications, electronic commerce (e-commerce) applications, business applications and/or other applications.

A virtual computer system service may be used by a computing resource service provider to provide computer system resources for customers. The virtual computer system service may provide such computer system resources by instantiating virtual machine instances on physical hardware. The physical hardware may include physical hosts, which may include any device or equipment configured to execute instructions for performing data computation, manipulation or storage tasks, such as a computer or server. A physical host may be equipped with any needed processing capability including processors, such as a CPU, GPU, DSP, memory, storage devices, buses, input/output ports, and networking equipment. The physical hardware may also support specialized instructions such as, for example, SGX instructions, TPM instructions or the like.

Figure 8:
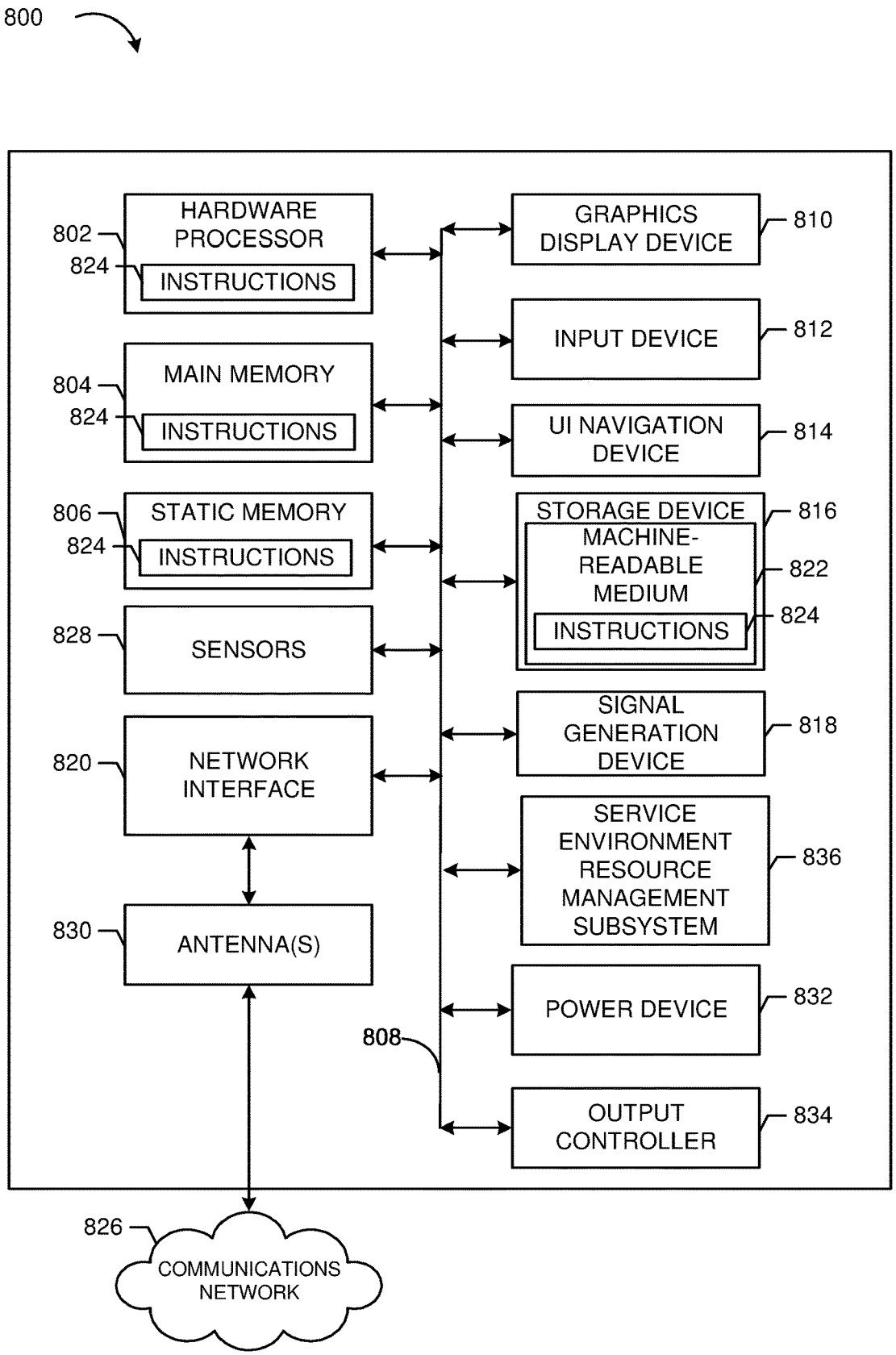
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 (e.g., implemented in whole or in part in the context of embodiments described in connection with other figures. In some embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in Wi-Fi direct, peer-to-peer (P2P) (or other distributed) network environments. The machine 800 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations. One or more machines may be used in the implementation of a computing resource service provider.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include any combination of the illustrated components. For example, the machine 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (e.g., drive unit) 816, a signal generation device 818, and a network interface device/transceiver 820 coupled to antenna(s) 830. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

Service environment resource management subsystem 836 may refer to software, hardware, or a combination thereof that implements various systems and methods described in connection with FIGS. 1-7. For example, service environment resource management subsystem 836 may be a software module (e.g., a DLL module) that is included as part of executable code that a service of a service provider uses to implement a set of API endpoints to fulfill or service API requests by clients of a computing resource service provider. Service environment resource management subsystem 836 may include executable code that, as a result of execution by processor 802, causes the machine 800 to fulfill various API requests such as those discussed in connection with FIGS. 1-7. Processes described in connection with FIGS. 5-7 may be implemented at least in part on machine 800. For example, machine 800 may include executable code to process API requests and submit various workflows for execution to a message queue service.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 800 and that causes the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

A container, as referred to herein, packages up code and all its dependencies so an application (also referred to as a task) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. Virtual machines are commonly referred to as compute instances or simply "instances." Some containers can be run on instances that are running a container agent, and some containers can be run on bare-metal servers.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Additionally, the phrase "based on" may be synonymous to "based at least in part on" rather than "based solely on" unless it is explicitly stated or clear from the context that the latter meaning is intended. Additionally, the various terms used throughout this disclosure may relate to various fields of mathematics, science, and/or engineering. These terms are to be interpreted according to their respective fields unless otherwise clear from the context in which they are being described. As a non-limiting example, the terms "proper subset" and "subset" are to be interpreted according to their definitions given in mathematical set theory, unless clearly indicated by the context.

Additionally, features of various systems and methods described herein that are implemented "by" performing a step are to be construed or may be synonymous to "by at least" performing said step rather than "by solely" performing said step, unless it is explicitly stated or clear from the context. For example, a system that implements specific features "by" performing a particular step may be described in a manner that is not exclusive of the performance of other steps, some of which may be related to said particular step. In some cases, other steps may omitted from various discussions for the sake of clarity.

What is claimed is:

1. A computer-implemented method, comprising:
   receiving a first application programming interface (API) request from a client to identify resources associated with a service environment, the first API request encoding an identifier for a root entity of the service environment;
   providing, as a first response, a list of resources associated with the service environment;
   receiving a second API request from the client specifying at least a portion of the first list of resources to validate for deletion;
   processing the second API request by:
      obtaining a first resource of the at least a portion of the first list of resources;
      determining, based on a first resource type of the first resource, a resource type-specific validation task;
      executing the resource type-specific validation task to determine whether the first resource is unused;
      recording a first result of the execution of the resource type-specific validation task indicating whether the first resource is unused; and
      providing the first result to the client;
   receiving a third API request from the client to delete at least the first resource;
   processing the third API request by:
      determining, based on a first resource type of the first resource, a resource type-specific deletion task;
      executing the resource type-specific deletion task to disable or deactivate the first resource in a recoverable manner and schedule the first resource to be deleted in an unrecoverable manner after a predetermined period of time has elapsed;
      recording a second result of the execution of the resource type-specific deletion task; and
      providing the second result to the client.

2. The computer-implemented method of claim 1, further comprising:
   receiving a fourth API request from the client to stop deletion of the first resource, wherein the fourth API request is received before the predetermined period has elapsed;
   processing the fourth API request by:
      re-enabling or reactivating the first resource; and
      cancel the schedule to delete the first resource in the unrecoverable manner.

3. The computer-implemented method of claim 1, further comprising:
   as a result of the predetermined period of time elapsing, permanently deleting the first resource.

4. The computer-implemented method of claim 1, wherein:
   the first resource type is a service deployment environment; and
   the executing of the resource type-specific validation task to determine whether the first resource is unused comprises:
      performing an active capacity check;
      performing a request check;
      performing a deployment check; and
      performing a consumables check.

5. A system, comprising:
   one or more processors; and
   memory storing executable instructions that, as a result of execution by the one or more processors, cause the system to:
      receive a request from a client to delete one or more resources of a service environment;
      identify, for a first resource of the one or more resources, a first resource type;
      determine, based on the first resource type, a first deletion task;
      execute the first deletion task in connection with the first resource, wherein the execution of the first deletion task causes the first resource to be unusable by the client in the service environment and schedules a second deletion task to delete the first resource in an unrecoverable manner after a predetermined period of time has elapsed; and
      record an indication that the first resource was deleted in a recoverable manner.

6. The system of claim 5, wherein executable instructions include further instructions that, as a result of execution by the one or more processors, further cause the system to:
   determine that the predetermined period of time has elapsed;
   delete the first resource; and
   record a second indication that the first resource was deleted in the unrecoverable manner.

7. The system of claim 5, wherein executable instructions include further instructions that, as a result of execution by the one or more processors, further cause the system to:
   receive a second request from the client to halt deletion of the first resource;
   perform one or more operations to re-activate the first resource; and
   cancel execution of the second deletion task.

8. The system of claim 5, wherein executable instructions include further instructions that, as a result of execution by the one or more processors, further cause the system to:

identify, for a second resource of the one or more resources, a second resource type;

determine, based on the second resource type, a third deletion task, wherein the third deletion task is different from the first deletion task; and execute the third deletion task in connection with the second resource, wherein the execution of the third deletion task causes the second resource to be unusable by the client in the service environment and schedules a fourth deletion task to delete the second resource in an unrecoverable manner after the predetermined period of time has elapsed.

9. The system of claim 5, wherein the first resource is a service deployment environment.

10. The system of claim 5, wherein the first deletion task is a serverless compute function.

11. The system of claim 5, wherein the request is a second request and the executable instructions include further instructions that, as a result of execution by the one or more processors, further cause the system to:

receive a first request from the client to identify unused resources in the service environment, wherein the first request encodes an identifier for a root entity of the service environment;

determine a plurality of resources usable in the service environment;

determine, for the plurality of resources, that the one or more resources are unused; and provide, as a response to the first request, a list including the one or more resources.

12. The system of claim 11, wherein the executable instructions to determine, for the plurality of resources, that the one or more resources are unused include instructions that, as a result of execution by the one or more processors, cause the system to:

determine a first member of the plurality of resources;

determine a first resource type-specific validation task based on a first resource type of the first member;

execute the first resource type-specific validation task for the first member;

determine a second member of the plurality of resources;

determine a second resource type-specific validation task based on a second resource type of the second member, wherein the second resource type is different from the first resource type; and execute the second resource type-specific validation task for the second member.

13. A non-transitory computer-readable storage medium storing executable instructions that, as a result of being executed by one or more processors of a computer system, cause the computer system to:

submit, to a server, a first request to delete one or more resources of a service environment, wherein the request causes the server to delete the one or more resources of the service environment by:

identifying, for a first resource of the one or more resources, a first resource type;

determining, based on the first resource type, a first deletion task; and executing the first deletion task in connection with the first resource, wherein the execution of the first deletion task causes the first resource to be unusable by the computer system in the service environment and schedules a second deletion task to delete the first resource in an unrecoverable manner after a predetermined period of time has elapsed;

receive, from the server, a first response to the first request indicating fulfillment of the first request;

submit, to the server, a second request, wherein successful fulfillment of the second request utilizes the first resource; and receive, from the server, a second response indicating failure to successfully fulfill the second request, wherein the failure is based on the deletion of the first resource.

14. The non-transitory computer-readable storage medium of claim 13, wherein the instructions, as a result of being executed by the one or more processors of the computer system, further cause the system to:

submit, to the server and prior to the predetermined period of time elapsing, a third request, to recover the first resource; and receive, from the server, a third response to the third request indicating that first resource was successfully recovered.

15. The non-transitory computer-readable storage medium of claim 14, wherein the instructions, as a result of being executed by the one or more processors of the computer system, further cause the system to:

submit, to the server, a fourth request, wherein successful fulfillment of the second request utilizes the first resource; and receive, from the server, a fourth response to the fourth request indicating successful fulfillment of the fourth request.

16. The non-transitory computer-readable storage medium of claim 13, wherein the instructions, as a result of being executed by the one or more processors of the computer system, further cause the system to:

submit, to the server and after the predetermined period of time has elapsed, a third request, to recover the first resource; and receive, from the server, a third response to the third request indicating failure to recover the first resource.

17. The non-transitory computer-readable storage medium of claim 13, wherein the instructions, as a result of being executed by the one or more processors of the computer system, further cause the system to:

submit, to the server, a second request to validate a set of resources of the service environment;

receive, from the service, a second response to the second request indicating fulfillment of the second request; and obtain validation status of the set of resources, wherein the validation status indicates whether resources of the set of resources are unused in the service environment.

18. The non-transitory computer-readable storage medium of claim 17, wherein the validation status indicates that the one or more resources are unused in the service environment.

19. The non-transitory computer-readable storage medium of claim 17, wherein the validation status indicates that the first resource is being used in the service environment.

20. The non-transitory computer-readable storage medium of claim 13, wherein the one or more resources comprises:

the first resource, wherein the first resource is of a first resource type; and a second resource, wherein the second resource is of a second resource type different from the first resource type.

* * * * *

UNITED STATES PATENT AND TRADEMARK OFFICE
CERTIFICATE OF CORRECTION

| | | |
|---|---|---|
| PATENT NO. | : 11,995,467 B1 | |
| APPLICATION NO. | : 17/376017 | |
| DATED | : May 28, 2024 | |
| INVENTOR(S) | : Suresh Prakash Goacher, Arun Anilkumar and Nishit Nihal Vas | |

It is certified that error appears in the above-identified patent and that said Letters Patent is hereby corrected as shown below:

In the Specification

Column 6, Line 3 should read:
-- identifier and then verifies that the resource identifier matches --

Column 7, Line 30 should read:
-- request 104 to discover resources in the service environment. In --

Column 7, Line 45 should read:
-- returned to client 102 in response to the first API request. --

Column 7, Line 49 should read:
-- Client 102 may use the first API request 104 or any other --

Column 8, Line 22 should read:
-- In various embodiments, a client submits a second API --

Column 17, Line 58 should read:
-- may be sent to the client as an email, in response to API --

Column 20, Line 62 should read:
-- may wait for the satisfaction of a set of conditions. If the time --

Column 22, Line 40 should read:
-- to a second event but that need not be the case-the serverless --

Signed and Sealed this
Sixteenth Day of July, 2024

Katherine Kelly Vidal
*Director of the United States Patent and Trademark Office*